(12) United States Patent
Back et al.

(10) Patent No.: US 7,949,768 B2
(45) Date of Patent: May 24, 2011

(54) METHOD AND SYSTEM FOR CONNECTING OF WIRELESS-INTERNET USING DOMAIN BASED NUMERAL

(75) Inventors: Gap-Chun Back, Uijeongbu (KR); Dae-Jin Jeon, Seoul (KR)

(73) Assignee: KT Corporation, Seongnam (KR)

( * ) Notice: Subject to any disclaimer, the term of this patent is extended or adjusted under 35 U.S.C. 154(b) by 667 days.

(21) Appl. No.: 10/501,739

(22) PCT Filed: Feb. 9, 2002

(86) PCT No.: PCT/KR02/00216
§ 371 (c)(1),
(2), (4) Date: Jul. 16, 2004

(87) PCT Pub. No.: WO03/090110
PCT Pub. Date: Oct. 30, 2003

(65) Prior Publication Data
US 2005/0050140 A1    Mar. 3, 2005

(51) Int. Cl.
*G06F 15/16* (2006.01)
(52) U.S. Cl. .................. 709/229; 709/203
(58) Field of Classification Search .......... 709/203, 709/229, 201, 202
See application file for complete search history.

(56) References Cited

U.S. PATENT DOCUMENTS

| | | | |
|---|---|---|---|
| 6,542,933 B1* | 4/2003 | Durst et al. | 709/229 |
| 6,865,608 B2* | 3/2005 | Hunter | 709/229 |
| 7,362,727 B1* | 4/2008 | O'Neill et al. | 370/331 |
| 2002/0052912 A1* | 5/2002 | Griswold et al. | 709/200 |
| 2002/0091754 A1* | 7/2002 | Jang et al. | 709/203 |
| 2003/0033155 A1* | 2/2003 | Peerson et al. | 705/1 |
| 2003/0039241 A1* | 2/2003 | Park et al. | 370/352 |
| 2004/0054754 A1* | 3/2004 | Hwang et al. | 709/217 |

FOREIGN PATENT DOCUMENTS

| | | |
|---|---|---|
| JP | 2002-152846 | 5/2002 |
| KR | 2001-0035059 | 5/2001 |
| KR | 2001-0103152 | 11/2001 |
| KR | 2001-0103152 A | 11/2001 |
| KR | 2002-0036072 | 5/2002 |

(Continued)

OTHER PUBLICATIONS

RFC 1034 "Domain Name—Concepts and Facilities" Nov. 1987 pp. 1-55.*

(Continued)

*Primary Examiner* — Karen C Tang
(74) *Attorney, Agent, or Firm* — Finnegan, Henderson, Farabow, Garrett & Dunner, L.L.P.

(57) ABSTRACT

The present invention relates to a system and method for connecting wireless internet using number-base domain, the method according to the present invention may comprise the steps of (a) receiving an internet connection request signal from the mobile telephone; (b) determining if the received internet connection request signal is a number domain connection request signal and determining if the number domain exists in pre-stored number structure; (c) converting the number domain into a letter domain if the number domain exists in the pre-stored number structure; (d) transmitting web site information corresponding to the converted number domain to the mobile terminal. According to present invention, the domain input process can be simpler as the user has only to input number domain corresponding to homepage to be connected and press execution button.

9 Claims, 6 Drawing Sheets

FOREIGN PATENT DOCUMENTS

KR     2002-0045084     6/2002

OTHER PUBLICATIONS

RFC 1035 "Domain Name—Implementation and Specification" Nov. 1987 pp. 1-55.*

Greece, Rethmono "Proceeding of the 5th WSES International Conference on Circuits, Systems, Communications and computers" Jul. 2001, pp. 1-8.*

Notification of the First Office Action, dated May 18, 2007, issued by the State Itellectual Property Offie of the People's Republic of China for a corresponding Chinese Patent Application No. 028278534.

* cited by examiner

METHOD AND SYSTEM FOR CONNECTING OF WIRELESS-INTERNET USING DOMAIN BASED NUMERAL

TECHNICAL FIELD

The present invention relates to a system and method for connecting wireless internet using number-base domain.

BACKGROUND ART

Among mobile communication services, the personal communication service is a service that a user can perform voice and low speed data communication using small and light mobile terminal without being restricted to time and location.

Subscribers of mobile communication service can communicate in any place, further can receive necessary information in the form of letter or voice.

Generally, there are lots of web sites which are free or in charge for providing information. A mobile terminal which can connect to those web sites were developed and widely used. The user used contents by connecting to personal network (persnet) server or by inputting domain with mobile terminal in order to user service of the contents provider through the persnet server.

The user connected to an internet site of contents provider using a mobile terminal by inputting a phone number corresponding to the internet site. Otherwise, the mobile terminal user inputs domain name using letter or number and the mobile terminal connects to the corresponding homepage through web-browser.

Referencing FIG. 1, if the user inputs number domain with mobile terminal, the user inputs number corresponding to letter in order. For example, if the user inputs 'game.co.kr' user inputs 4 once corresponding to g, inputs 2 once corresponding to a, inputs 6 once corresponding to m, inputs 3 twice corresponding to e, inputs 2 three times corresponding to c, inputs 6 three times corresponding to o, inputs 5 twice corresponding to k, and inputs 7 twice corresponding to r.

After inputting above mentioned numbers, the user selects execution button and the mobile terminal is connected to the site game.co.kr.

In prior art, there were problems that many processes are needed to connect to the internet homepage.

Further, in case of connecting to internet homepage using a mobile terminal, there was inconvenience that user should input domain in letter.

Furthermore, in case of inputting number corresponding to letter, the user had to input number corresponding to letter many times.

Furthermore, as the user use contents in connection with the persnet server, the user could not use the contents unconnected to the persnet server.

DISCLOSURE OF THE INVENTION

The present invention is devised to solve the above-mentioned problems.

An object of the present invention is to provide a system and method for connecting wireless internet using number-base domain, which enables users to connect to internet homepage by inputting number domain without additional process.

Another object of the present invention is to provide a system and method for connecting to wireless internet, which enables users to connect to wireless internet by inputting simple composition of numbers without inputting letter domain of a homepage.

In order to achieve the above-mentioned objects, in accordance with one preferred embodiment of the present invention, there is provided with a method for connecting to internet using a mobile terminal comprising the steps of (a) receiving an internet connection request signal from the mobile telephone; (b) determining if the received internet connection request signal is a number domain connection request signal and determining if the number domain exists in pre-stored number structure; (c) converting the number domain into a letter domain if the number domain exists in the pre-stored number structure; (d) transmitting web site information corresponding to the converted number domain to the mobile terminal.

In accordance with preferred embodiment of the present invention, the number domain information may comprise at least one of a contents classification number, a first domain number and a second domain number, wherein the first domain number may be the highest level domain and the second domain number may be a number corresponding to a name of a site.

In accordance with another embodiment of the present invention, the number domain is a number corresponding to letter designated on a key pad of the mobile terminal.

In accordance with another embodiment of the present invention, the step (d) may transmit the website information in divided size corresponding to the size of LCD of the mobile terminal.

In accordance with another embodiment of the present invention, there is provided a method for connecting to internet using a mobile telephone comprising the steps of, receiving an internet connection request signal from the mobile telephone; determining if the received internet connection request signal is a number domain connection request signal or a letter domain connection request signal; analyzing number structure of the number domain if the number domain connection request signal is received; determining if the analyzed number structure exists in pre-stored number structure; converting the number domain into a letter domain if the analyzed number domain exists in the pre-stored number structure; and transmitting information of a site corresponding to the converted letter domain through a network.

In accordance with a preferred embodiment of the present invention, the format of the domain may include at least one of number, English letter, Korean letter, composition of letter and number.

In accordance with a preferred embodiment of the present invention may further comprise the steps of receiving a number domain information corresponding to a letter domain of a site from an operator of the site; determining if a same number domain information exists in pre-stored number domain; and registering the received number domain as a number domain of the site if a same number domain does not exists in pre-stored number domain.

In accordance with a preferred embodiment of the present invention, the present invention further comprise the step of registering at least one of the number domain or the letter domain corresponding to the site.

In accordance with another embodiment of the present invention, there may be provided a receiving an internet connection request signal and key data which includes number from a mobile terminal through a wireless network; converting the key data into a domain name using a predetermined regulation or a conversion table; routing so that a use connects to a site corresponding to the domain name.

BRIEF DESCRIPTION OF THE DRAWINGS

The above objects and other advantages of the present invention will become more apparent in detailed descriptions of the preferred embodiments thereof with reference to the attached drawings, in which.

THE DESCRIPTION OF THE REFERENCE CHARACTERS OF THE MAJOR PARTS OF THE DRAWINGS

Figure 1:
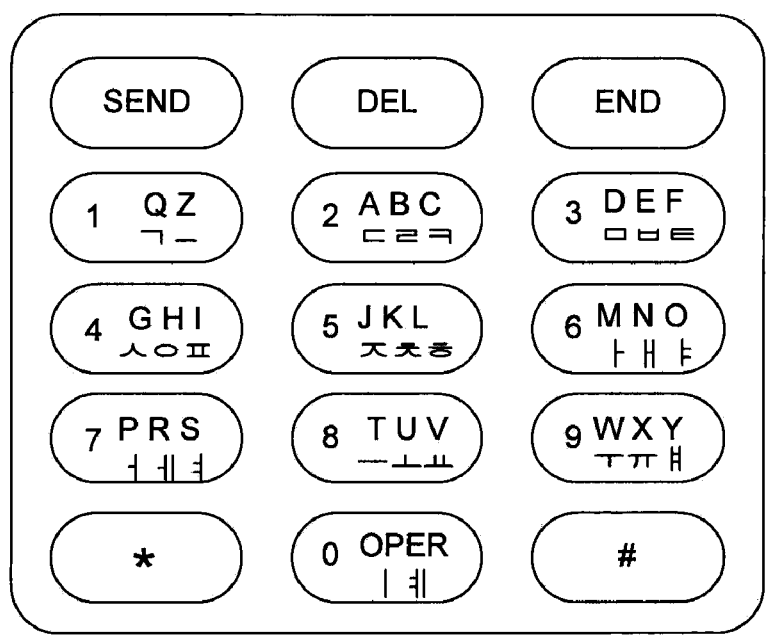
FIG. 1 illustrates a key pad of a mobile terminal.

100: mobile terminal
110: base station
120: IWF
130: converter
140: router
150: contents provision server
160: persnet server

THE BEST MODES FOR CARRYING OUT THE INVENTION

Hereinafter, preferred embodiments of the present invention will be described in more detail with reference to the accompanying drawings.

Figure 2:
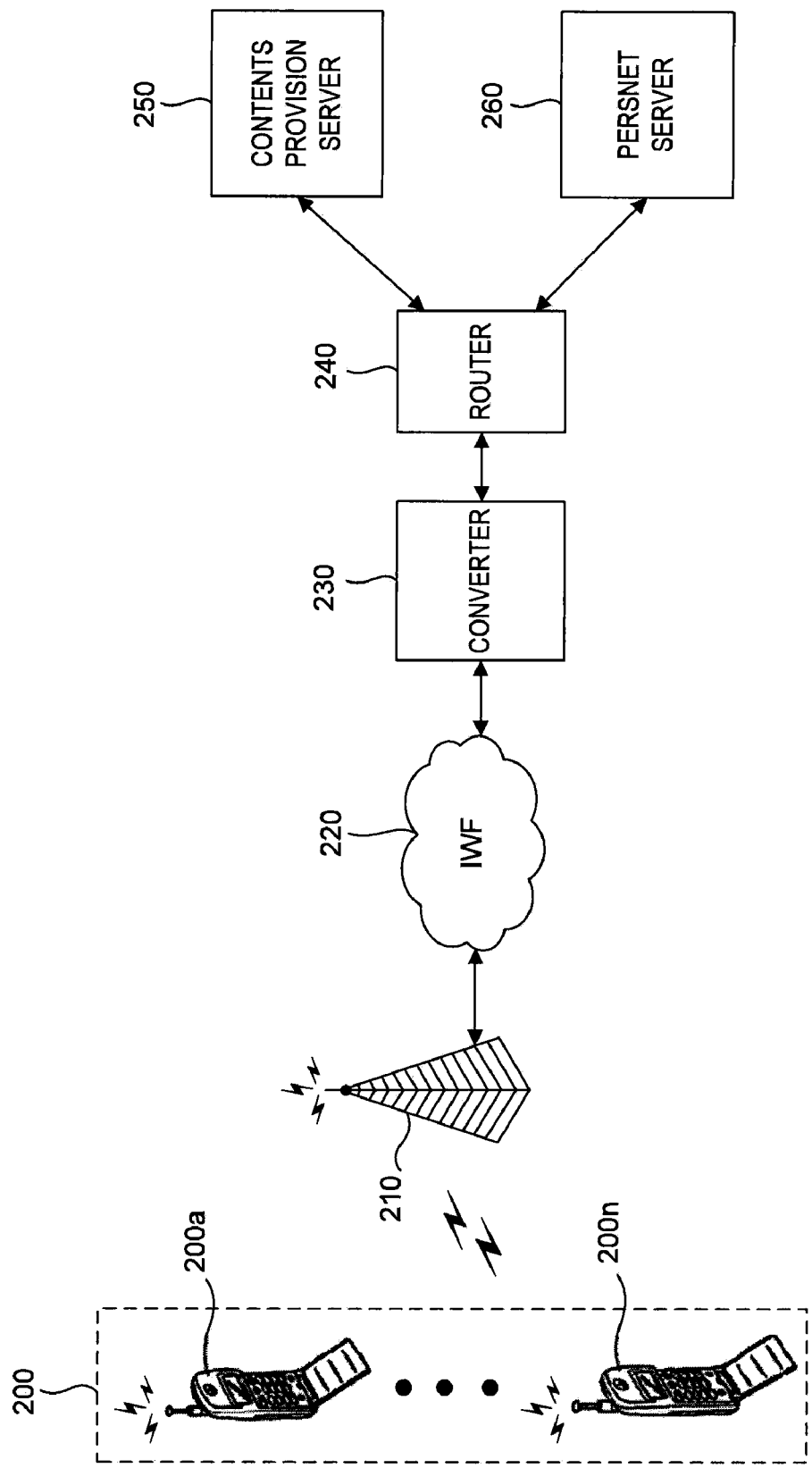
FIG. 2 illustrates a schematic block diagram of the wireless internet connection system using number-base domain according to a preferred embodiment of the present invention.

FIG. 2 illustrates a schematic block diagram of the wireless internet connection system using number-based domain according to a preferred embodiment of the present invention.

As shown in FIG. 2, the wireless internet connection system using number-based domain may comprise mobile terminals 200a, . . . , 200n(hereinafter will be named a mobile terminal 200), a based station 210, an IWF (interworking function device) 220, a converter 230, a router 240, a contents provision server 250, and a persnet server 260.

The mobile terminal 200 transmits a number domain connection request signal including number domain information which a user inputted to the base station 210 and receives contents of a site corresponding to the number domain information included in the number domain connection request signal.

On connecting the internet using the mobile terminal 200, the domain information may be inputted by inputting number domain corresponding to a site or inputting letter domain.

The number domain connection request signal may comprise an identifier, a number domain code which user inputted and a user index for identifying user. According to an embodiment of the present invention, a user phone number may used as a user index and other user identification means may be used as the user index.

The base station 210 receives the number domain connection request signal from the mobile terminal 200, transmits it to the IWF 200 and receives contents of the site from the IWF, transmits it to the mobile terminal 200.

Although it is not illustrated in FIG. 2, a mobile switching center may be included in the wireless internet connection system between the base station 210 and the IWF 220. The number domain connection request signal is transmitted to the mobile switching center through a base station controller. If the mobile switching center receives the number domain connection system, the mobile switching center recognizes that it should be transmitted to the IWF 220 through the identifier and transmits it to the IWF 200.

The IWF has function of modem and PPP server, which enables users to transmit data only with the mobile terminal without wireless modem and keeps the connection between the mobile terminal and internet or computer network.

In other words, the IWF 220 transforms a mobile communication protocol into an internet protocol when signal is transmitted from mobile communication network to internet and transforms an internet protocol into a mobile communication protocol when signal is transmitted from internet to mobile communication network.

The converter 230 receives the number domain connection request signal from the mobile terminal 200 and determines if the signal is a number domain connection request signal or a letter domain connection request signal through the identifier of the signal. If the received signal is the number domain connection request signal, the converter 230 analyzes the number structure of the number domain information and determines if the analyzed number structure exists.

If the number structure corresponding to the transmitted number domain exists, the converter 320 converts the number domain into a real domain (for example, English or Korean letter domain) and transmits the converted domain to the router 240.

The number domain may comprise plurality of numbers, according to a preferred embodiment of the present invention, the number domain may comprise contents classification number, the first domain number and the second domain number.

The first domain number means a number corresponding to the highest domain number which includes co.kr, net, org, com, ac.kr.

The second domain number means a number corresponding to a name of a site which includes game, chosun, etc.

The contents classification number is a number for classifying the kind of the site to be connected. For example, the contents classification number is 111 for game, 114 for traffic information, 1472 for news information and the contents classification number is predetermined. The converter 230 searches a database in order to output the letter domain corresponding to the number domain. At this case, it is preferable for the database to store the number domain and the letter domain corresponding to the number domain based on the kind of the contents, which reduces database search time.

For example, if the number domain is 11142631, the converter classifies the 11142631 to 111,4263,1.

111 is contents classification number corresponding to game related contents, 4263 is the second domain number corresponding to 'game'. The second domain number is the number corresponding to the name of the site which user requests to connect using mobile terminal.

Referencing FIG. 1, in case of 'game', 4 is pressed once for g, 2 is pressed once for a, 6 is pressed once for m, and 3 is pressed two times for e, which means that the second domain number is a number corresponding to letter in mobile terminal. However according to another embodiment of the present invention, the second domain number may be arbitrarily designated number by a service provider.

1 which is the first domain number may be predetermined as 'co.kr'. In the same way, 2 may be predetermined as 'com' and 3 may be predetermined as 'net'. Otherwise, the first domain number may be number corresponding to English letter in mobile terminal.

In number domain, the number of bytes allocated to the each classification number is predetermined.

In above mentioned number domain 11142631, 111 represents game related contents, 4263 represents 'game', 1 represents 'co.kr'. The converter searches game related field of the database through 111 and recognizes that 4263 and 1 represent 'game' and 'co.kr' respectively and converts 11142631 to 'game.co.kr'. The converter transmits the transformed domain to the router 240.

If the received domain from the mobile terminal 200 is a letter domain such as game.co.kr, the converter 230 transmits the received domain information directly to the router 240. As mentioned above, the kind of domain is determined through the identifier included in the signal.

The router 240 sets up the path so that the mobile terminal 200 is connected to the converted domain by converter 230.

The contents provision server 250 provides various inter services. The contents provision server 250 provides various information to the mobile terminal 200.

The persnet server 260 is managed by mobile communication entrepreneur. The mobile communication user can receive various kind of services selectively through persnet server 260. More particularly, the persnet server 260 provides services such as internet surfing, chatting, email, mobile banking, electronic commerce, geographic service, news, stocks, weather, traffic information, job, record information, game, etc.

According to another preferred embodiment of the present invention, the contents provision server 250 and the persnet server 260 may be implemented as one server and provide various kind of services to the mobile terminal 200.

According to another preferred embodiment of the present invention, the converter 230 and the router 240 may be implemented as one device. For example, a router which functions as router and converter together may be used.

At this case, the router 240 receives the connection request signal from the mobile terminal 200 and determines if the received signal is the number domain connection request signal or the letter domain connection request signal.

If the received signal from the mobile terminal 200 is the number domain connection request signal, router 240 analyzes the number structure of the number domain information, converts the number domain into the letter domain corresponding to the analyzed number structure, and then connects the mobile terminal 200 to the converted domain.

In case the received domain is letter domain such as 'game.co.kr', the router connects the mobile terminal 200 to the received domain.

Figure 3:
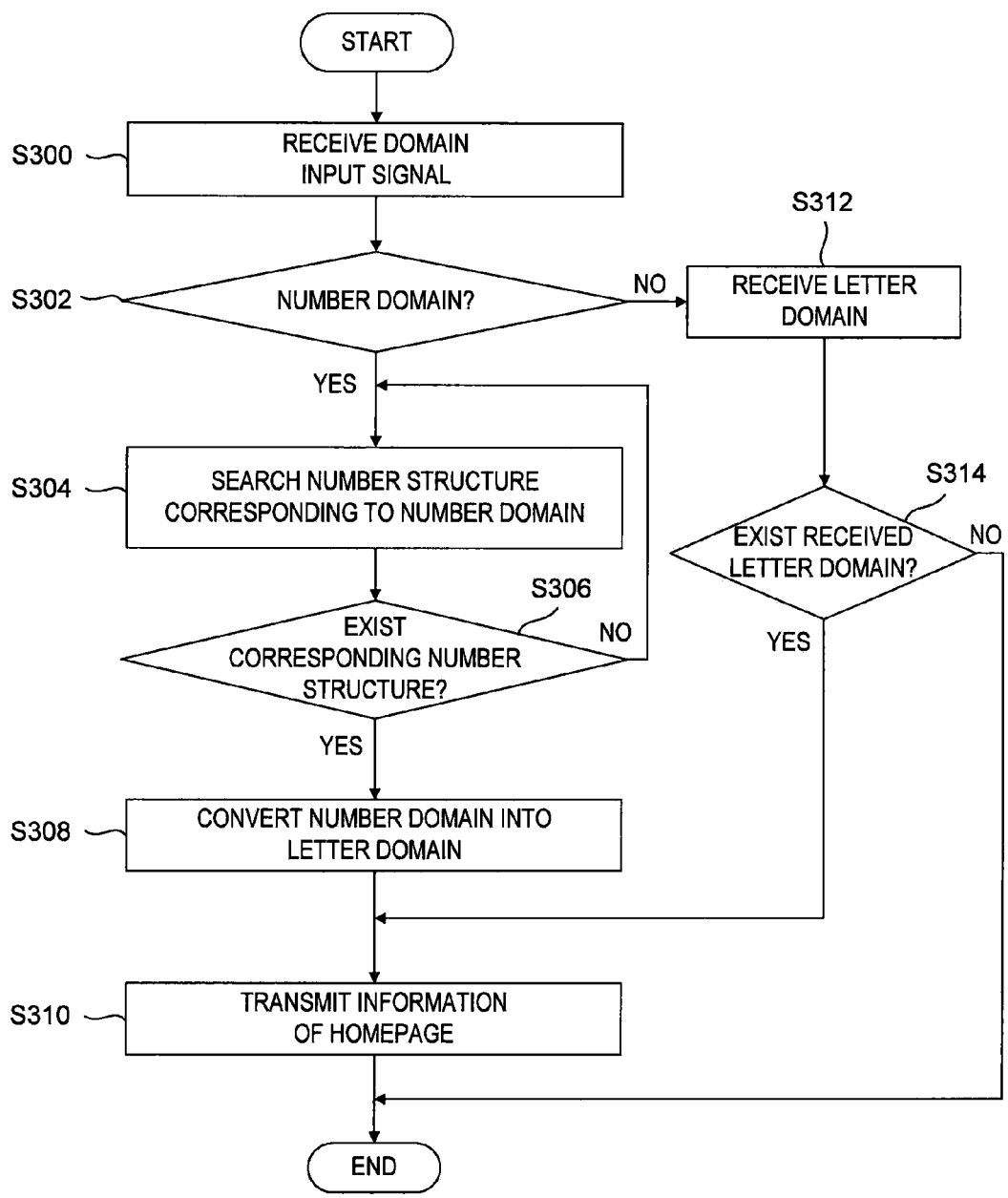
FIG. 3 illustrates a flow chart of connecting wireless internet using number-base domain.

FIG. 3 illustrates a flow chart showing process of connecting wireless internet using number domain according to a preferred embodiment of the present invention, Referencing FIG. 3, the converter receives an internet connection request signal from the mobile terminal S300.

The converter which received the internet connection request signal determines if the received signal is number domain connection request signal or the letter domain connection request signal through the identifier of the signal S302.

If the received signal is the number domain connection request signal, the converter analyzes the number structure of the number domain and searches if a number structure corresponding to the analyzed number structure exists S304.

If a number structure corresponding to the analyzed number structure exists, the converter converts the received number domain into a letter domain S308.

For example, if a user of the mobile terminal inputs domain information as '11142631', the inputted domain information is transmitted to the converter through the base station and the IWF. The converter classifies received '11142631' into 111, 4263, 1. Then, the converter searches if a number structure corresponding to the analyzed 111, 4263, 1 exists in pre-stored domain information number structure.

If the analyzed number structure exists, the converter searches if the letter domain matching the analyzed number structure exists. If the matching letter domain is 'game.co.kr', the converter converts the number domain into 'game.co.kr' and transmits it to the router.

As mentioned in above example, the converter transmits the converted domain to the router S310.

When the number domain is converted to the letter domain, the number domain classification structure is pre-stored in converter.

According to another embodiment of the present invention, the number domain may be an arbitrarily designated number (For example, '1111').

The converted letter domain matching the number domain is transmitted to the router by the converter. The router searches converted letter domain and sets up the path in order to connect the mobile terminal to the domain.

By connecting the domain, the site information corresponding to the letter domain is transmitted and displayed in the mobile terminal.

If the inputted domain information by the mobile terminal user is the letter domain such as 'game.co.kr' S312, the domain information is transmitted to the router through the base station, the IWF and the converter. The router searches if the received letter domain information exists S314.

If the site corresponding to the received letter domain exists, the site information is transmitted and displayed in the mobile terminal.

Figure 4:
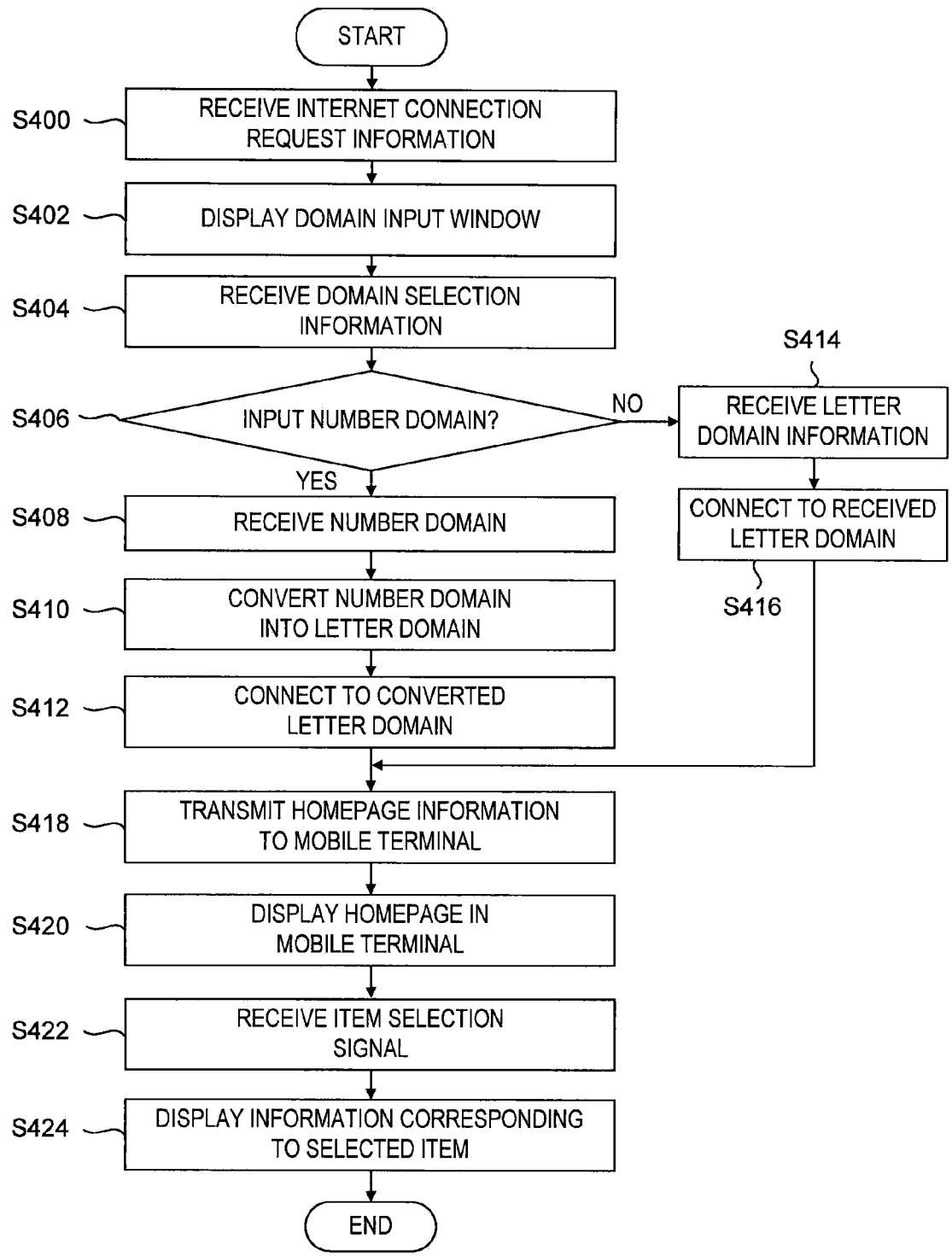
FIG. 4 illustrates a flow chart of receiving contents after connecting the internet according to a preferred embodiment of the present invention.

FIG. 4 illustrates a flow chart showing the process of connecting the internet and receiving contents after connecting the internet according to another embodiment of the present invention.

Referencing FIG. 4, the mobile terminal receives the internet connection request information from the user S400. If the internet connection request is inputted from the user, domain input screen is displayed in the mobile terminal S402. A menu is provided in the displayed screen so that the user can select number domain connection or the letter domain connection.

The user selects at least one domain connection from the menu (S404). If the user selects number domain connection, the user inputs the number domain information of the site which the user wants to connect (For example, if the user wants to connect chosun.com, the user inputs '1472' which represents news related contents, '246786' which represents the name of the site and '2' which represents corn, therefore combined number domain is '14722467862') and the mobile terminal generates the number domain connection request signal and generated number domain connection request signal is transmitted to the converter through the IWF.

The converter analyzes the number structure of the received number domain and searches if the analyzed number structure exists in pre-stored number structure. If the analyzed number structure exists in pre-stored number structure, the router searches if the letter domain matching the number domain exists. If the letter domain matching the number domain exists, the converter converts the number domain into the letter domain matching the number domain and transmits it to the router S410.

The router sets up the path in order for the mobile terminal to connect to the letter domain and by the path connects the mobile terminal to the received domain S412.

If the user of the mobile terminal selects letter domain, letter domain information (For example, 'chosun.com') is transmitted to the router S414.

The router searches transmitted domain and connects the mobile terminal to the domain S416.

As mentioned above, the mobile terminal is connected to the domain which the user wants to connect, the homepage information corresponding to the domain is transmitted to the mobile terminal S418, and main screen of the site is displayed in the mobile terminal S420.

The user selects necessary item in the displayed main screen S422. If the user selects an item, information corresponding to the item is displayed in the mobile terminal S424. The displayed information is transmitted in divided size corresponding to the size of the LCD display of the mobile terminal.

For example, the case that user of the mobile terminal connects the portal site 'naver.com' and selects computer item is explained. If the user selects the number domain, the user may input '1343628372' ('1343' represents portal site classification, '62837' represents naver which is number button corresponding to letter naver in mobile terminal, '2' represents com). If the user selects the letter domain, the user inputs n, a, v, e, r, ., c, o, m. If the mobile terminal is connected to the site, main screen including various items such as news, game, computer, health, etc is displayed.

In the displayed main screen, the user selects computer item. After selecting the computer item, if the user selects necessary item in displayed screen sequentially, selected information is transmitted to the mobile terminal.

The information is transmitted in divided size corresponding to the size of LCD, because the LCD of the mobile terminal is small.

The method of dividing information to the size corresponding to the size of the mobile terminal LCD is explained below.

The line of the information which the mobile terminal user selected is analyzed and each line is converted to the size that matches the size of the LCD screen and converted line is transmitted. The user may select necessary information using scroll key of the mobile terminal among the transmitted information.

According to another embodiment of the present invention, number domain may be series of numbers corresponding to letters of letter domain.

For example, 'ez-patent.co.kr' is converted to 210.107.46.101 in the internet, and the user may connect to the site 'ez-patent.co.kr' by inputting 210.107.46.101 or the user may connect to the site 'ez-patent.co.kr' by inputting 3 corresponding to e, 1 corresponding to z, 7 corresponding to p, 2 corresponding to a, 8 corresponding to t, 3 corresponding to e, 6 corresponding to n, 8 corresponding to t, 1 corresponding to co.kr.

Figure 5:
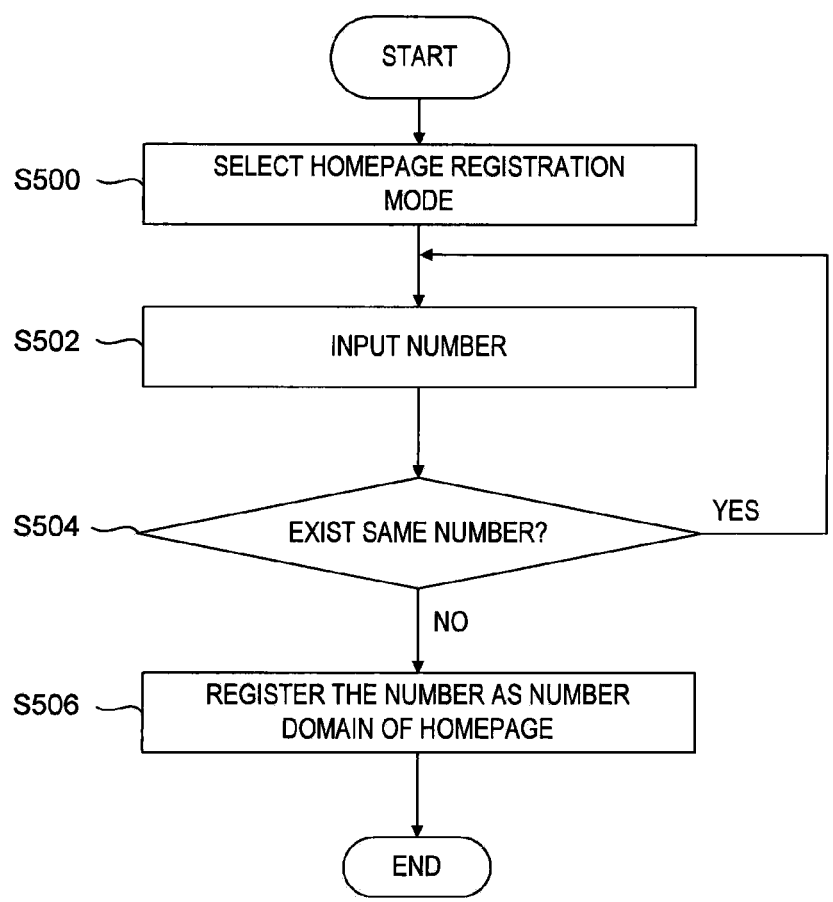
FIG. 5 illustrates a flow chart of registering homepage as number domain according to a preferred embodiment of the present invention.

FIG. 5 illustrates a flow chart showing process of registering number-base domain homepage according to a preferred embodiment of the present invention.

Referencing FIG. 5, an operator of homepage selects number registration mode of the homepage using mobile terminal or telephone in order to register number-domain homepage S500.

If the operator selects the registration mode, homepage registration number input window is displayed and the operator inputs arbitrary number in displayed homepage registration number input window (S502).

For example, if the operator of the daum.net site would like to register the site as number domain, the operator selects the homepage number registration mode and inputs arbitrary number domain in homepage registration number input window.

The number domain of daum.net, for example, may be 134332863. In 134332863, 1343 represents portal site, 3286 is number corresponding to daum, 3 represents net by the above mentioned number structure, or the number domain of daum.net may be 1234 which is arbitrarily determined number by the homepage operator.

The converter which received the number domain searches if the same number domain exists in server S504. If the same number does not exist, the number domain inputted by the operator is registered as the number domain of the corresponding homepage.

For example, in case that daum.net is registered as 1234, a mobile terminal user selects domain input menu, and then press 1234 using number button and corresponding homepage is displayed.

If the same number as the number which the site operator inputted exists, step 502 proceeds again.

According to another embodiment of the present invention, the mobile terminal user can store the domain by designating a particular number for preferred site. The user can connect the site using the designated number.

For example, a mobile terminal user preferring chosun.com site designate designates 1 for chosun.com and if the user would like to connect to chosun.com, the user can connect to the site by selecting 1 in internet connection mode.

Figure 6:
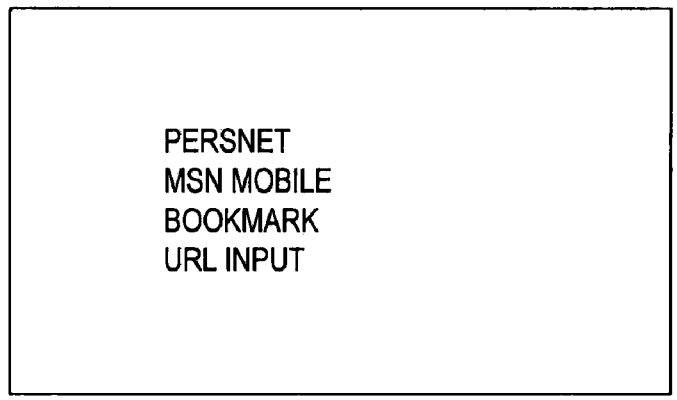
FIG. 6 illustrates an example of initial connection screen according to a preferred embodiment of the present invention.
Figure 7:
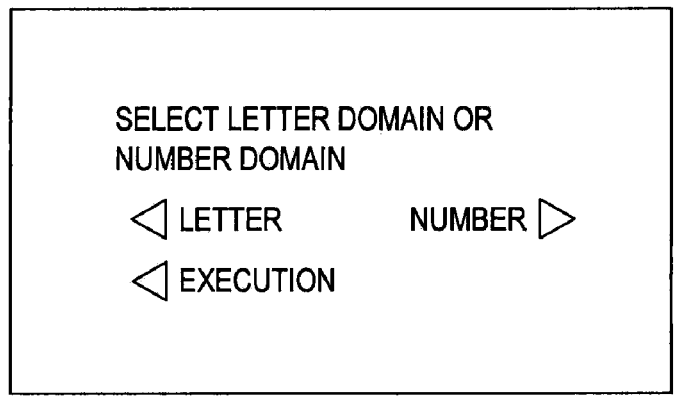
FIG. 7 illustrates an example of screen display of selecting internet connection according to a preferred embodiment of the present invention.

FIG. 6 illustrates an example of initial connection screen according to a preferred embodiment of the present invention, and FIG. 7 illustrates an example of screen display of selecting internet connection according to a preferred embodiment of the present invention.

If a mobile terminal user selects menu for connecting internet, screen as FIG. 6 is displayed. If the user selects domain input menu shown in FIG. 6, a message that select a letter domain or a number domain is displayed in screen as shown in FIG. 7. The mobile terminal user selects at least one of a letter domain and a number domain.

If the mobile terminal user selects the letter domain, the user inputs letter domain of the site and selects execution button.

For example, in case the mobile terminal user would like to connect homepage of chuosunilbo, the user inputs chosun.com and selects execution button.

If the mobile terminal user selects the number domain, the input window for inputting number domain is displayed in the mobile terminal. The user inputs the number domain and selects execution button.

If the execution button is selected, the inputted number domain is transmitted to the converter through the IWF and the number structure is analyzed by the converter. The converter converts the number domain into the letter domain corresponding to the analyzed number structure. The user can connect to the homepage corresponding to the converted letter domain.

INDUSTRIAL APPLICABILITY

As mentioned above, according to the present invention, domain input process can be simpler when a user would like to connect to the internet homepage using mobile terminal as the use can connect to the homepage by inputting designated number domain corresponding to the letter domain without additional process.

Further, as the user connects to internet through the contents server, the user can utilize contents which are not provided in persnet server, which enables the user to contact more variable contents.

Furthermore, the process for connecting internet using mobile telephone can be more convenient by just inputting simple number domain.

The invention claimed is:

1. A method for connecting to the Internet using a mobile terminal, the method comprising:
   receiving an internet connection request signal from the mobile terminal;
   determining whether the received intenet connection request signal is a number domain connection request signal, wherein the number domain connection request signal comprises an identifier for identifying the number domain connection request signal, a number domain inputted by a user, and a user index for identifying the user;
   determining whether the number domain of the number domain connection request signal exists in a pre-stored number structure, wherein the number domain comprises a contents classification number, a first domain number, and a second domain number;
   converting the number domain into a letter domain if the number domain exists in the pre-stored number structure; and
   transmitting website information corresponding to the converted letter domain to the mobile terminal,
   wherein:
      the first domain number is a number indicating a highest level domain; and the second domain number is a number indicating a site name;
      the contents classification number, the first domain number, and the second domain number are arranged in the number domain according to a predetermined sequence;
      the contents classification number is a pre-set shortcut number according to a type of contents of a website, and the first domain number is a pre-set shortcut number associated with each of the highest level domains; and
      the first domain number, the second domain number, and the contents classification number can be determined arbitrarily by the user, respectively.

2. A method for connecting to the Internet using a mobile telephone, the method comprising:
   receiving an intenet connection request signal from the mobile telephone;
   determining whether the received Internet connection request signal is a number domain connection request signal or a letter domain connection request signal, wherein the number domain connection request signal comprises an identifier for identifying the number domain connection request signal, a number domain inputted by a user, and a user index for identifying the user;
   analyzing a number structure of the number domain of the number domain connection request signal if the number domain connection request signal is received, wherein the number domain comprises a contents classification number, a first domain number, and a second domain number;
   determining whether the analyzed number structure exists in a pre-stored number structure;
   converting the number domain into a letter domain if the analyzed number structure exists in the pre-stored number structure; and
   transmitting information of a site corresponding to the converted letter domain through a network,
   wherein:
      the first domain number is a number indicating a highest level domain and the second domain number is a number indicating a site name;
      the contents classification number, the first domain number, and the second domain number are arranged in the number domain according to a predetermined sequence;
      the contents classification number is a pre-set shortcut number according to a type of contents of a website, and the first domain number is a pre-set shortcut number associated with each of the highest level domains; and
      the first domain number, the second domain number, and the contents classification number can be determined arbitrarily by the user, respectively.

3. The method of claim 2, further comprising:
   receiving the number domain corresponding to the letter domain of the site from an operator of the site;
   determining whether the number domain exists in the pre-stored number domain; and
   registering the received number domain as a number domain of the site if the number domain does not exist in the pre-stored number domain.

4. The method of claim 2 further comprising registering at least one of the number domain and the letter domain corresponding to the site.

5. An Internet connection system using a mobile telephone, the system comprising:
   a memory containing program instructions; and
   a processor coupled to the memory and executing the program instructions to perform a method comprising:
      receiving an internet connection request signal from the mobile telephone;
      determining whether the received intenet connection request signal is a number domain connection request signal, wherein the number domain connection request signal comprises an identifier for identifying the number domain connection request signal, a number domain inputted by a user, and a user index for identifying the user;
      determining whether the number domain of the number domain connection request signal exists in a pre-stored number structure, wherein the number domain comprises a contents classification number, a first domain number and a second domain number;
      converting the number domain into a letter domain if the number domain exists in the pre-stored number structure; and
      transmitting information of a site corresponding to the converted letter domain through a network,
      wherein:
         the first domain number is a number indicating a highest level domain and the second domain number is a number indicating a site name;
         the contents classification number, the first domain number, and the second domain number are arranged in the number domain according to a predetermined sequence;

the contents classification number is a pre-set shortcut number according to a type of contents of a website, and the first domain number is a pre-set shortcut number associated with each of the highest level domains; and the first domain number, the second domain number, and the contents classification number can be determined arbitrarily by the user, respectively.

6. The system of claim 5, wherein the method further comprises:
receiving the number domain corresponding to the letter domain from an operator of the site;
determining whether the number domain exists in the pre-stored number domain; and
registering the received number domain as a number domain of the site if the number domain does not exist in the pre-stored number domain.

7. An internet connection system using a mobile telephone, the system comprising:
a memory containing program instructions; and
a processor coupled to the memory and executing the program instructions to perform a method comprising:
receiving an internet connection request signal from the mobile telephone;
determining whether the received internet connection request signal is a number domain connection request signal or a letter domain connection request signal, wherein the number domain connection request signal comprises an identifier for identifying the number domain connection request signal, a number domain inputted by a user, and a user index for identifying the user;
analyzing a number structure of the number domain of the number domain connection request signal if the number domain connection request signal is received, wherein the number domain comprises a contents classification number, a first domain number, and a second domain number;
determining whether the analyzed number structure exists in a pre-stored number structure;
converting the number domain into a letter domain if the analyzed number structure exists in the pre-stored number structure; and
transmitting information of a site corresponding to the converted letter domain through a network,
wherein:
the first domain number is a number indicating a highest level domain and the second domain number is a number indicating a site name;
the contents classification number, the first domain number, and the second domain number are arranged in the number domain according to a predetermined sequence;
the contents classification number is a pre-set shortcut number according to a type of contents of a website, and the first domain number is a pre-set shortcut number associated with each of the highest level domains; and
the first domain number, the second domain number, and the contents classification number can be determined arbitrarily by the user, respectively.

8. A system for connecting to the Internet wirelessly using a number-based domain, the system comprising:
a memory containing program instructions; and
a processor coupled to the memory and executing the program instructions to perform a method comprising:
receiving an intenet connection request signal from a mobile terminal;
determining whether the received internet connection request signal is a number domain connection request signal, wherein the number domain connection request signal comprises an identifier for identifying the number domain connection request signal, a number domain inputted by a user, and a user index for identifying the user;
determining whether the number domain of the number domain connection request signal exists in a pre-stored number structure, wherein the number domain comprises a contents classification number, a first domain number, and a second domain number;
converting the number domain into a letter domain if the number domain exists in the pre-stored number structure; and
transmitting information of a website corresponding to the converted letter domain to the mobile terminal through a network by the program,
wherein:
the first domain number is a number indicating a highest level domain and the second domain number is a number indicating a site name;
the contents classification number, the first domain number, and the second domain number are arranged in the number domain according to a predetermined sequence;
the contents classification number is a pre-set shortcut number according to a type of contents of a website, and the first domain number is a pre-set shortcut number associated with each of the highest level domains; and
the first domain number, the second domain number, and the contents classification number can be determined arbitrarily by the user, respectively.

9. A system for connecting to the Internet wirelessly using a number-based domain, the system comprising:
a memory containing program instructions; and
a processor coupled to the memory and executing the program instructions to perform a method comprising:
receiving an internet connection request signal from a mobile telephone;
determining whether the received intenet connection request signal is a number domain connection request signal or a letter domain connection request signal, wherein the number domain connection request signal comprises an identifier for identifying the number domain connection request signal, a number domain inputted by a user, and a user index for identifying the user;
analyzing a number structure of the number domain of the number domain connection request signal if the number domain connection request signal is received, wherein the number domain comprises a contents classification number, a first domain number, and a second domain number;
determining whether the analyzed number structure exists in a pre-stored number structure;
converting the number domain into a letter domain if the analyzed number structure exists in the pre-stored number structure; and
transmitting information of a site corresponding to the converted letter domain through a network by the program, wherein:
the first domain number is a number indicating a highest level domain and the second domain number is a number indicating a site name;
the contents classification number, the first domain number, and the second domain number are arranged in the number domain according to a predetermined sequence;
the contents classification number is a pre-set shortcut number according to a type of contents of a website, and the first domain number is a pre-set shortcut number associated with each of the highest level domains; and
the first domain number, the second domain number, and the contents classification number can be determined arbitrarily by the user, respectively.

* * * * *